US012768663B2

(12) United States Patent
Zhang et al.

(10) Patent No.: US 12,768,663 B2
(45) Date of Patent: Oct. 20, 2026

(54) REAL-TIME ADAPTIVE GEOSPATIAL MAPPING WITH AUTONOMOUS VEHICLES

(71) Applicant: INTERNATIONAL BUSINESS MACHINES CORPORATION, Armonk, NY (US)

(72) Inventors: Li Bo Zhang, BeiJing (CN); Hamid Majdabadi, Ottawa (CA); Su Liu, Austin, TX (US); Yang Liang, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/816,802

(22) Filed: Aug. 27, 2024

(65) Prior Publication Data

US 2026/0063432 A1 Mar. 5, 2026

(51) Int. Cl.
*G01C 21/34* (2006.01)
*G01S 17/89* (2020.01)
(Continued)

(52) U.S. Cl.
CPC ..... *G01C 21/3461* (2013.01); *G01C 21/3415* (2013.01); *G01C 21/3446* (2013.01);
(Continued)

(58) Field of Classification Search
CPC ............ G01C 21/3461; G01C 21/3415; G01C 21/3446; G01S 17/89
See application file for complete search history.

(56) References Cited

U.S. PATENT DOCUMENTS 9,463,793 B2 * 10/2016 Lind ..................... B60W 10/04
9,612,123 B1 4/2017 Levinson et al.
(Continued)

FOREIGN PATENT DOCUMENTS

KR 20210157611 12/2021
KR 20210157611 A * 12/2021 ............. H04W 4/70

OTHER PUBLICATIONS

Deore et al., "A New Approach for Navigation and Traffic Signs Indication Using Map Integrated Augmented Reality for Self-Driving Cars", https://www.scpe.org/index.php/scpe/article/view/1742, Aug. 1, 2020, 10 pages.
(Continued)

*Primary Examiner* — Scott A Browne
*Assistant Examiner* — Jason Nguyen
(74) *Attorney, Agent, or Firm* — Seed Intellectual Property Law Group LLP

(57) ABSTRACT

A computer-implemented method may include receiving, by a processor set, sensor suite data from an autonomous vehicle (AV); determining, by the processor set, an AV location based on the sensor suite data; determining, by the processor set, a non-AV location based on global positioning system data; mapping, by the processor set, a digital environment based on the sensor suite data and the non-AV location; generating, by the processor set, a route in the digital environment based on the sensor suite data, the AV location, and the non-AV location, wherein the route in the digital environment is configured to avoid the AV location; and communicating, by the processor set, the route to a device of the non-AV.

18 Claims, 6 Drawing Sheets

(51) Int. Cl.
*G06V 10/80* (2022.01)
*G06V 10/82* (2022.01)

(52) U.S. Cl.
CPC .............. *G01S 17/89* (2013.01); *G06V 10/80* (2022.01); *G06V 10/82* (2022.01)

(56) References Cited

U.S. PATENT DOCUMENTS

| | | | | |
|---|---|---|---|---|
| 10,106,153 | B1 * | 10/2018 | Xiao | G01S 13/89 |
| 11,079,497 | B2 * | 8/2021 | Li | G01S 19/49 |
| 2018/0075759 | A1 * | 3/2018 | Kim | G08G 5/55 |
| 2019/0367278 | A1 * | 12/2019 | Bellar | G06Q 10/08 |
| 2020/0218256 | A1 * | 7/2020 | Mcnew | G01C 21/3415 |
| 2020/0412811 | A1 | 12/2020 | Campbell | |
| 2022/0234618 | A1 * | 7/2022 | Kabzan | B60W 50/0097 |
| 2023/0065414 | A1 | 3/2023 | Ariannezhad et al. | |

OTHER PUBLICATIONS

Anonymous, "How to Configure Maximo Spatial Maps for Mobile Devices.", https://www.ibm.com/support/pages/how-configure-maximo-spatial-maps-mobile-devices, Accessed Aug. 27, 2024, 5 pages.

Anonymous, "ESRI and IBM Maximo Spatial", https://www.esri.com/content/dam/esrisites/sitecore-archive/Files/Pdfs/library/fliers/pdfs/esri-IBM-maximo.pdf, Accessed Aug. 27, 2024, 1 page.

Anonymous, "IBM Maximo Anywhere Documentation", https://www.ibm.com/docs/en/maximo-anywhere, Accessed Aug. 27, 2024, 1 page.

Anonymous, "Local Motors Debuts "Olli", the First Self-driving Vehicle to Tap the Power of IBM Watson", https://uk.newsroom.ibm.com/2016-Jun-16-Local-Motors-Debuts-Olli-the-First-Self-driving-Vehicle-to-Tap-the-Power-of-ibm-Watson, Accessed Aug. 27, 2024, 4 pages.

Anonymous, "IBM IoT Connected Vehicle Insights Documentation", https://www.ibm.com/docs/en/icvi, Accessed Aug. 27, 2024, 1 page.

Anonymous, "Digital Map Market Size, Share & Trends Analysis Report by Type (GIS, LiDAR, Digital Orthophotography, Aerial Photography, GPS), by Usage, by Services, by Application, by Region, and Segment Forecasts, 2023-2030", https://www.grandviewresearch.com/industry-analysis/digital-map-market, Accessed Aug. 27, 2024, 9 pages.

* cited by examiner

REAL-TIME ADAPTIVE GEOSPATIAL MAPPING WITH AUTONOMOUS VEHICLES

BACKGROUND

Aspects of the present invention generally relate to adaptive geospatial mapping systems for vehicles based on global positioning system (GPS) data, vehicle sensor data, internet-of-things (IOT) data, etc.

Autonomous vehicles (AV) are frequently common on roadways and operate alongside non-autonomous vehicles (non-AV). AVs are vehicles capable of operating with reduced or no human input to propulsion, steering, or braking systems. AVs may include computer or processor controlled propulsion, steering, or braking systems in operable communication with vehicle sensors configured to monitor a driving environment and facilitate autonomous or partially autonomous navigation. Non-AVs are vehicles with no or minimal computer or processor controlled propulsion, steering, or braking systems. Non-AVs require driver input for propulsion, steering, braking, navigation, etc.

SUMMARY

In a first aspect of the invention, there is a computer-implemented method including: receiving, by a processor set, sensor suite data from an autonomous vehicle (AV); determining, by the processor set, an AV location based on the sensor suite data; determining, by the processor set, a non-AV location based on global positioning system data; mapping, by the processor set, a digital environment based on the sensor suite data and the non-AV location; generating, by the processor set, a route in the digital environment based on the sensor suite data, the AV location, and the non-AV location, wherein the route in the digital environment is configured to avoid the AV location; and communicating, by the processor set, the route to a device of the non-AV.

In another aspect of the invention, there is a computer program product including one or more computer readable storage media having program instructions collectively stored on the one or more computer readable storage media. The program instructions are executable to: receive sensor suite data from an autonomous vehicle (AV); determine an AV location based on the sensor suite data; determine a non-AV location based on global positioning system data; map a digital environment based on the sensor suite data and the non-AV location; generate a route in the digital environment based on the sensor suite data, the AV location, and the non-AV location, wherein the route in the digital environment is configured to avoid the AV location; and communicate the route to a device of the non-AV.

In another aspect of the invention, there is a system including a processor set, one or more computer readable storage media, and program instructions collectively stored on the one or more computer readable storage media. The program instructions are executable to: receive sensor suite data from an autonomous vehicle (AV); determine an AV location based on the sensor suite data; determine a non-AV location based on global positioning system data; map a digital environment based on the sensor suite data and the non-AV location; generate a route in the digital environment based on the sensor suite data, the AV location, and the non-AV location, wherein the route in the digital environment is configured to avoid the AV location; and communicate the route to a device of the non-AV.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
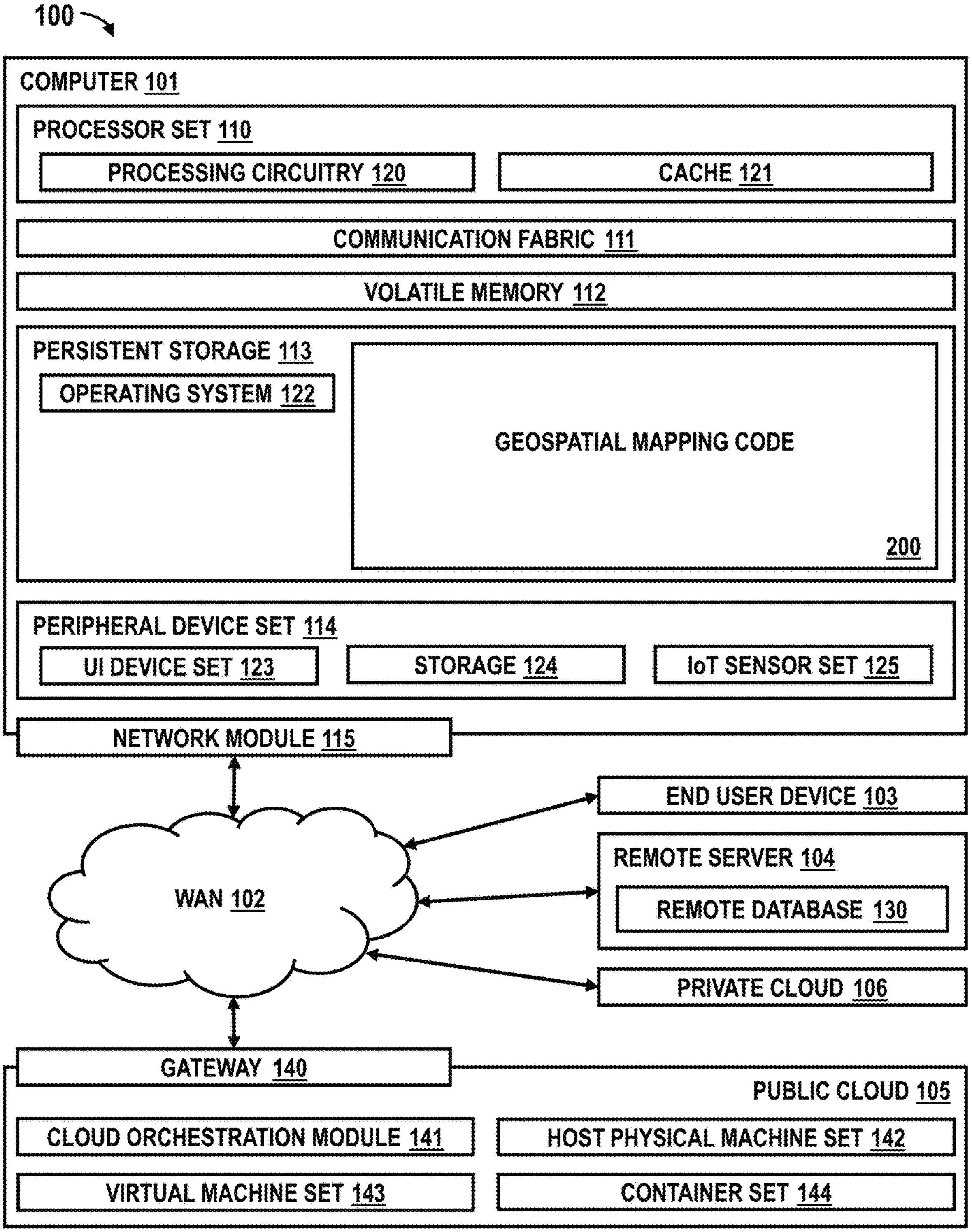
FIG. 1 depicts a computing environment according to an embodiment of the present invention.

Aspects of the present invention generally relate to adaptive geospatial mapping systems for vehicles and, more particularly, to adaptive geospatial mapping of vehicles including an identification of an AV based on AV sensor activity, GPS data, IOT data, and non-AV mapping preferences. In embodiments, aspects of the present invention provide a method, system, and computer program product for collecting AV sensor suite data and IoT data using a vehicle-to-everything (V2X) communication network in response to a sensor status of the driving mode being changed from manual to autonomous. Autonomous driving may include: driver assistance systems such as advanced driver assistance systems (ADAS); partial driving automation, such as lane departure warning systems and adaptive cruise control; conditional driving automation, such as systems where the vehicle carries out driving functions with required driver attention or intervention; high driving automation, such as systems where the vehicle carries out driving functions with only minor driver attention or intervention required; and full driving automation, such as systems where the vehicle carries out driving functions with zero driver attention or intervention required. In embodiments, aspects of the present invention provide a method, system, and computer program product for generating geospatial mapping and route planning for non-AV mapping preferences, such as avoiding routes where AVs are present. Non-AV may include vehicles with no driving automation but may include driver assistance features such as warning signals and emergency safety actions. Non-AVs require driver-controlled braking, steering, accelerating, etc.

An increasing number of AVs over time may result in issues such as road safety, difficulty efficiently managing traffic, and difficulty estimating vehicle costs and insurance premiums in high-traffic areas. Geospatial mapping systems integrate AV locations, AV density, and AV autonomy levels and may provide improved route mapping relied on by drivers using smartphones, computing devices, and vehicle infotainment systems.

Conventional geospatial mapping systems in the technical field of route mapping for vehicles based on GPS data do not consider road safety, efficient traffic management, vehicle costs and insurance premiums in high-traffic areas based on an AV presence. Aspects of the present invention include a method, system, and computer program product configured to detect and track AV data and incorporate AV data into geospatial mapping within a digital environment to allow a driver to request route mapping to avoid AVs. In embodiments, digital environment may include a software application including a two or three-dimensional digital mapping system, user interface, and corresponding functionality for communicating and displaying information corresponding to vehicle positions, vehicle speeds, vehicle trajectories, vehicle routes, stationary objects, roadways, etc. In embodiments, a digital environment may allow a user, such as a vehicle driver, to find preferred driving routes from one location to another. The digital environment may provide "turn-by-turn" directions, display maps, provide traffic updates, estimated travel times, points of interest, etc. Aspects of the present invention include a method, system, and computer program product configured to detect and track AV data and incorporate AV data into infrastructure management, e.g., utilizing AV traffic data to monitor traffic flow and adjust roadway infrastructure planning and development accordingly. Aspects of the present invention include a method, system, and computer program product configured to incorporate AV data into automobile insurance management by utilizing AV traffic data to monitor traffic flow, vehicle speeds, vehicle accidents, etc. and adjusting insurance rates or plans accordingly. In this manner, aspects of the present invention provide an improvement in the technical field by overcoming shortcomings of conventional route mapping methods and systems by detecting and tracking AV data and incorporating AV data into geospatial mapping considerations to allow a user to request route mapping to avoid AVs, incorporate AV data into infrastructure management, and incorporate AV data into automobile insurance management. Aspects of the present invention provide an improvement in the technical field by overcoming the shortcomings of route mapping for vehicles by collecting an AV sensor suite data from an AV over a network; estimating a location of the AV based on the sensor suite data; mapping a digital environment based on the sensor suite data relative to a location data of a non-AV; generating a route in the digital environment; and communicating the route to the non-AV over the network.

In embodiments, a computer-implemented method may include receiving, by a processor set, a sensor suite data from an autonomous vehicle (AV); determining, by the processor set, an AV location based on the sensor suite data; determining, by the processor set, a non-AV location based on global positioning system data; mapping, by the processor set, a digital environment based on the sensor suite data and the non-AV location; generating, by the processor set, a route in the digital environment based on the sensor suite data, the AV location, and the non-AV location, wherein the route in the digital environment is configured to avoid the AV location; and communicating, by the processor set, the route to a device of the non-AV. Aspects of the present invention improve the technical field of route mapping by providing improved route mapping to avoid AVs.

In embodiments, the computer-implemented method may include sensor suite data including a status of a sensor indicating that the AV is operating in an autonomous driving mode. Aspects of the present invention improve the technical field of route mapping by detecting AVs nearby.

In embodiments, the computer-implemented method may include modifying the route based on the status of the sensor that the AV is operating in a non-autonomous driving mode. Aspects of the present invention improve the technical field of route mapping by identifying AVs not currently operating in an autonomous driving mode.

In embodiments, the computer-implemented method may include determining the AV location including identifying the location of the AV via a global positioning system. Aspects of the present invention improve the technical field of route mapping by identifying AV locations via GPS.

In embodiments, the computer-implemented method may include performing neural network processing of the sensor suite data; and updating the digital environment based on processed sensor suite data. Aspects of the present invention improve the technical field of route mapping by providing real-time digital environments for route mapping.

In embodiments, the computer-implemented method may include determining the AV location including determining the location of an AV based on the sensor suite data relative to non-AV location data determined via a global positioning system. Aspects of the present invention improve the technical field of route mapping by identifying respective locations of AVs and non-AVs for mapping purposes.

In embodiments, the computer-implemented method may include mapping the digital environment including a SLAM algorithm configured to: perform feature extraction on the sensor suite data to identify vehicle, pedestrian, and object mapping data based on visual analysis performed on the sensor suite data. Aspects of the present invention improve the technical field of route mapping by identifying non-vehicle people, places, and objects.

In embodiments, the computer-implemented method may include generating the route in the digital environment including finding a shortest path between a first state and a final state via a shortest pathfinding algorithm using GPS data, wherein the route in the digital environment is configured to avoid the AV location. Aspects of the present invention improve the technical field of route mapping by generating shortest routes that also avoid AVs on roadways.

In embodiments, the computer-implemented method may include merging, via data fusion, the sensor suite data and visual analysis data; and augmenting an existing global positioning system navigation system with merged sensor suite data and visual analysis data. Aspects of the present invention improve the technical field of route mapping by augmenting existing GPS and mapping services with real-time sensor data.

In embodiments, the computer-implemented method may include modifying the route based on a user input. Aspects of the present invention improve the technical field of route mapping by allowing users to filter and modify route mapping based on their preferences.

In embodiments, the computer-implemented method may include sensor suite data including AV data including light detection and ranging data. Aspects of the present invention improve the technical field of route mapping by generating routes in a digital environment based on sensors data from other vehicles, including AVs.

In embodiments, a computer program product may include one or more computer readable storage media having program instructions collectively stored on the one or more computer readable storage media, the program instructions executable to: receive a sensor suite data from an autonomous vehicle (AV); determine an AV location based on the sensor suite data; determine a non-AV location based on global positioning system data; map a digital environment based on the sensor suite data and the non-AV location; generate a route in the digital environment based on the sensor suite data, the AV location, and the non-AV location, wherein the route in the digital environment is configured to avoid the AV location; and communicate the route to a device of the non-AV. Aspects of the present invention improve the technical field of route mapping by providing improved route mapping to avoid AVs.

In embodiments, the computer program product may include sensor suite data, including the status of a sensor indicating that the AV is operating in an autonomous driving mode. Aspects of the present invention improve the technical field of route mapping by detecting AVs nearby.

In embodiments, the computer program product may include modifying the route based on the status of the sensor that the AV is operating in a non-autonomous driving mode. Aspects of the present invention improve the technical field of route mapping by identifying AVs not currently operating in an autonomous driving mode.

In embodiments, the computer program product may include determining the AV location including identifying the location of the AV via a global positioning system. Aspects of the present invention improve the technical field of route mapping by identifying AV locations via GPS.

In embodiments, the computer program product may include performing neural network processing of the sensor suite data; and updating the digital environment based on processed sensor suite data. Aspects of the present invention improve the technical field of route mapping by providing real-time digital environments for route mapping.

In embodiments, the computer program product may include determining the AV location including determining the location of an AV based on the sensor suite data relative to non-AV location data determined via a global positioning system. Aspects of the present invention improve the technical field of route mapping by identifying respective locations of AVs and non-AVs for mapping purposes.

In embodiments, the computer program product may include mapping the digital environment including a SLAM algorithm configured to: perform feature extraction on the sensor suite data to identify vehicle, pedestrian, and object mapping data based on visual analysis performed on the sensor suite data. Aspects of the present invention improve the technical field of route mapping by identifying non-vehicle people, places, and objects.

In embodiments, the computer program product may include generating the route in the digital environment including finding a shortest path between a first state and a final state via a shortest pathfinding algorithm using GPS data, wherein the route in the digital environment is configured to avoid the AV location. Aspects of the present invention improve the technical field of route mapping by generating shortest routes that also avoid AVs on roadways.

In embodiments, a system may include a processor set, one or more computer readable storage media, and program instructions collectively stored on the one or more computer readable storage media, the program instructions executable to: receive a sensor suite data from an autonomous vehicle (AV); determine an AV location based on the sensor suite data; determine a non-AV location based on global positioning system data; map a digital environment based on the sensor suite data and the non-AV location; generate a route in the digital environment based on the sensor suite data, the AV location, and the non-AV location, wherein the route in the digital environment is configured to avoid the AV location; and communicate the route to a device of the non-AV. Aspects of the present invention improve the technical field of route mapping by providing improved route mapping to avoid AVs.

Implementations of the present invention provide adaptive real-time geospatial route mapping in a digital environment based on GPS and vehicle sensor data, and are therefore necessarily rooted in computer technology. For example, the steps of collecting an AV sensor suite data from an AV over a network; estimating a location of the AV based on the sensor suite data; mapping a digital environment based on the sensor suite data relative to a location data of the non-AV; generating a route in the digital environment; and communicating the route to the non-AV over the network are computer-based and cannot be performed in the human mind. For example, collecting AV sensor suite data from numerous AVs over a network would involve large-scale, continuous monitoring, calculation, and wireless communication of such data. These features would be impossible to accomplish on pen and paper and cannot be accomplished as a method of organizing human activity. Additionally, mapping a digital environment based on the sensor suite data relative to a location data of the non-AV; generating a route in the digital environment; and communicating the route to the non-AV over the network amounts to more than merely implementing a generic computer as a tool to gather, analyze, and output data and would be impossible to accomplish on pen and paper or performed in the human mind. In particular, the speed at which the collecting and communication of data, including GPS location data and sensor suite data, must be accomplished in order to effectuate the disclosed method, system, or computer program product, would be impossible to achieve on pen and paper, perform in the human mind, or be considered a method of organizing human activity.

Implementations of the present invention involve the technical field of artificial intelligence, including utilizing convolutional neural networks (CNN), recurrent neural networks (RNN), pattern recognition, or predictive modeling of vehicle sensor data and position data to improve the quality of GPS data and improve the ability to determine the location of an AV based on GPS data. Training and using a machine learning model are, by definition, performed by a computer and cannot practically be performed in the human mind (or with pen and paper) due to the complexity and massive amounts of calculations involved. For example, an artificial neural network may have millions or even billions of weights that represent connections between nodes in different layers of the model. As another example, the steps of improving the determination of the location of an AV via CNN or RNN artificial intelligence processing of GPS data may include training a CNN or RNN to identify patterns in large amounts of GPS data and predict corrections to existing map data. In some embodiments, this may include merging simultaneous localization and mapping (SLAM) data with GPS data via data fusion and processing the merged data through a CNN or RNN to predict corrections to existing map data. Processed merged data may be used as a mapping engine application programming interface (API) update to improve mapping functionality, such that an improved digital environment may be generated. In other words, processed merged data may update, supplement, or replace existing map data in order to generate a more accurate digital environment. Given this scale and complexity, it is simply not possible for the human mind, or for a person using pen and paper, to perform the number of calculations involved in training and/or using a machine learning model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a geospatial mapping code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
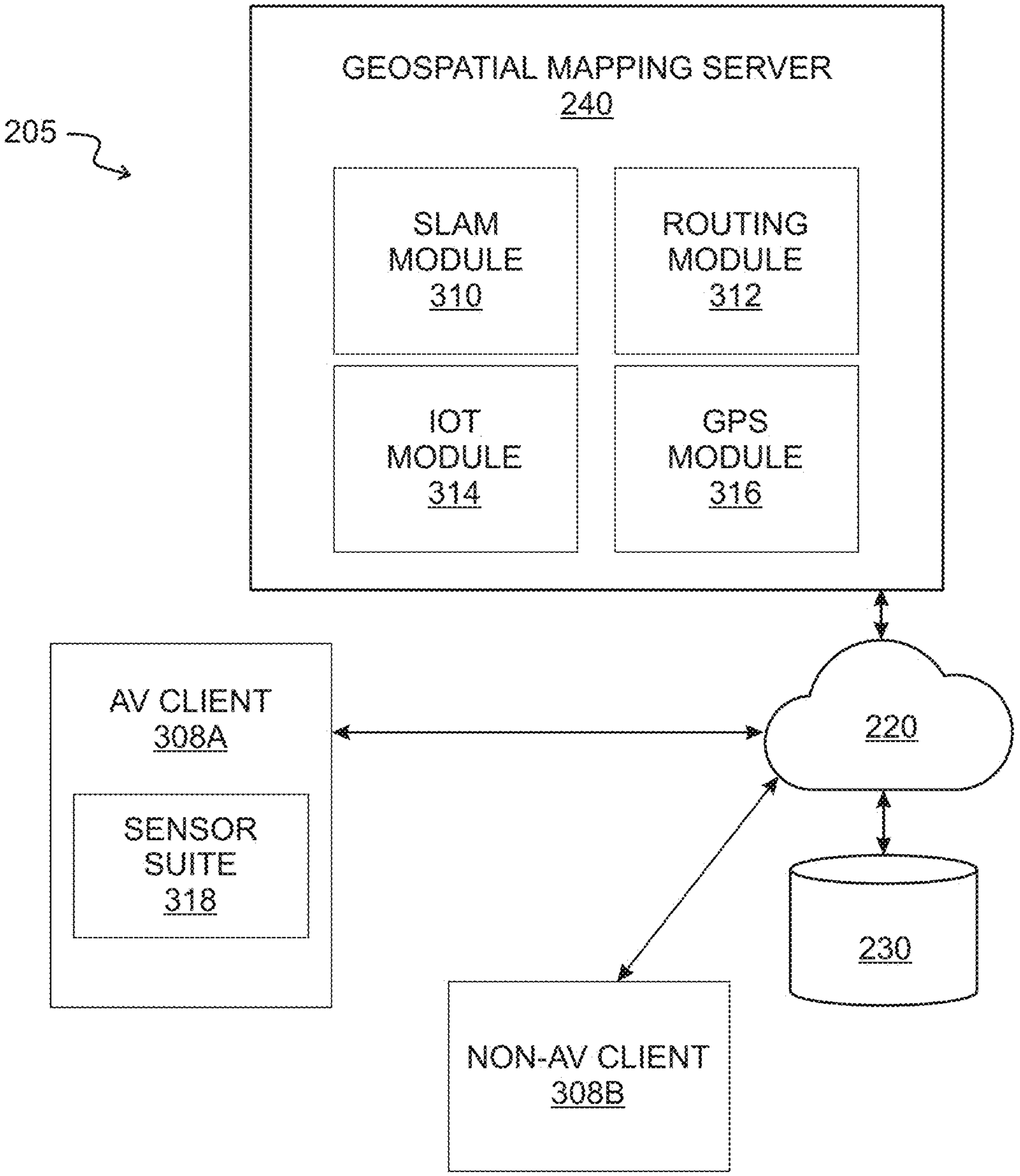
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes geospatial mapping server 240, corresponding to computer 101 as in FIG. 1. In embodiments, the environment includes a simultaneous localization and mapping (SLAM) module 310, IoT module 314, GPS module 316, and routing module 312, corresponding to the geospatial mapping code of block 200 of FIG. 1.

In embodiments, the SLAM module 310, IoT module 314, GPS module 316, and routing module 312 each comprise one or more modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The geospatial mapping server 240 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

The geospatial mapping server 240 is in operable communication with the AV client 308A and non-AV client 308B. In further embodiments, each of the AV client 308A and non-AV client 308B is a client-side software application in operable communication with the geospatial mapping server 240. The AV client 308A and non-AV client 308B may perform actions on behalf of the geospatial mapping server 240 on an AV or a driver device, such as a smart device such as a smartphone. The AV client 308A and non-AV client 308B may be configured to provide access to and use of services provided by the geospatial mapping server 240, such as over WAN 220 corresponding to WAN 102 of FIG. 1. WAN 220 may be an area network including wired or wireless network capabilities. A database 230, corresponding to remote server 104 or remote database 130 of FIG. 1, may store, for example, sensor suite 318 data, GPS data, and mapping data.

In embodiments, the SLAM module 310 is configured to include a SLAM algorithm configured to map a digital environment based on AV sensor suite 318 data relative to a location data of the non-AV. A SLAM algorithm may be configured to generate and update digital environments, such as a map of roadways, based on real-world environments. The SLAM algorithm may also be configured to track the location of a vehicle within the environment. The SLAM algorithm may include receiving sensor data from actors or devices in the environment and extracting features from the sensor data to identify objects, people, vehicles, buildings, etc. The SLAM algorithm may also estimate movement of objects, people, vehicles, etc. within the environment based on sensor data. The SLAM algorithm may also be configured to improve mapping via loop closure, such as by recognizing previously received sensor data and correcting errors in past position estimates, thereby improving accuracy. The SLAM module 310 may receive or collect sensor suite 318 data of an AV, such as light detection and ranging data collected via lidar methods, radar data, camera data, sonar data, ultrasonic data, and cellular or network-based positioning data. The SLAM module 310 may include a wireless access point or network interface configured to receive sensor suite 318 data over the WAN 220 via a wireless network communication protocol such as cellular networks or wireless networking protocols. The SLAM module 310 may receive or collect GPS data from the GPS module 316. Sensor suite 318 data may be communicated from AV client 308A over a wireless network to the SLAM module 310 of the geospatial mapping server 240. The SLAM module 310 may be configured to perform feature extraction of the sensor data to determine other vehicles, pedestrians, and objects used in localization and mapping. For example, feature extraction may identify a vehicle, pedestrian, and object mapping based on visual analysis. Feature extraction via visual analysis may include identifying computer-implemented detection of objects, spaces, and events within data such as lidar data, radar data, and video or camera data generated by a vehicle sensor suite. Visual analysis may include motion detection, pattern recognition, scene recognition, shape recognition, object recognition and tracking, etc. In some embodiments, the SLAM module 310 matches extracted features from current sensor suite 318 data to historical sensor suite 318 data. In this way, localization and mapping data may be updated over time. In some embodiments, the SLAM module 310 may merge, via data fusion, the sensor suite data and visual analysis data and augment existing GPS navigation systems with the merged sensor suite data and visual analysis data. Augmenting existing GPS navigation systems may include supplementing GPS navigation system data with merged sensor suite data and visual analysis data including information relating to real-time object positions and roadway conditions. In this way, augmented GPS navigation systems may include additional, real-time, vehicle and object data such that mapping functionality and accuracy is improved. Data fusion may include feature-level fusion, including combining features extracted from raw data, or decision-level fusion, including combining decisions or inferences made from data sources. Data fusion may occur via statistical methods, artificial intelligence, rule-based systems, or optimization methods. The SLAM module 310 may include a SLAM algorithm such as, but not limited to, graph-based SLAM, filter-based SLAM, monocular SLAM, or visual SLAM. The SLAM module 310 may correlate, incorporate, and transmit processed sensor suite 318 data to the routing module 312.

In embodiments, the routing module 312 is configured to receive processed sensor suite 318 data from the SLAM module 310, estimate the location of an AV based on the sensor suite 318 data relative to the non-AV, and generate a route in the digital environment for the non-AV to take in order to avoid AV traffic. Routing module 312 may include pre-existing digital map data or infrastructure (e.g., a third-party generated digital map including known roadways, objects, etc.). The routing module 312 may generate a route in the digital environment for the non-AV and map the route based on pre-existing digital map data. The routing module 312 may generate a route in the digital environment without the need to generate an entire digital environment in response to a route being generated. In other words, the routing module 312 may be configured to generate a route and render the route on an existing or pre-rendered digital map. In embodiments, the routing module 312 may receive route start and end points, such as a current location identified via GPS module 316 and a driver-input end point. Driver-input may be received, for example, through a user interface of a device or vehicle infotainment system. The routing module 312 may receive and utilize sensor suite 318 data processed by the SLAM module 310 to filter possible routes based on identified AVs in order to avoid routes having AVs present. In some embodiments, the routing module 312 may use an on or off status of sensors to determine whether an AV is operating in an autonomous driving mode. In other words, routing module 312 may not require visual data from a camera in a sensor suite 318 to determine that an AV is driving autonomously and may rely on an on or off status of sensors to determine whether an AV is operating in an autonomous driving mode. For example, an "on" status of a lidar sensor indicates that an AV is operating in an autonomous driving mode. The routing module 312 may use data to indicate that a camera in a sensor suite 318 is on to determine that an AV is driving autonomously. For example, sensor suite 318 data may indicate that vehicle exterior cameras and lidar sensors are in active use. In this scenario, the routing module 312 may conclude the AV is driving autonomously. The routing module 312 may adjust route planning to avoid AVs with sensor suite 318 data indicating that the AV is driving autonomously. In this way, routing module 312 may use sensor suite 318 data to identify that the AV is operating in an autonomous driving mode and modify the route based on an indication that the AV is operating in an autonomous driving mode. The routing module 312 may adjust route planning including modifying the route based on the indication that the AV is operating in an autonomous driving mode, such as by finding a shortest path from the start point to the end point without encountering an AV, e.g., being on the same roadway as an AV or being within, for example, a two-mile radius proximity of an AV. The routing module 312 may further adjust route planning including modifying routes based on user input, such as additional filtering differing from AV-based filtering to avoid, for example, major highways, construction areas, etc. Route planning may include shortest or fastest pathfinding and route planning based on GPS data, digital map data, and traffic data, such as by using a searching algorithm configured to find the shortest path between a first state and a final state. A route may be determined using, for example, a shortest path algorithm such as Dijkstra's Algorithm or an "A*" algorithm. The routing module 312 may be configured to communicate an instruction from the geospatial mapping server 240 to the non-AV client 308B to display the routing plan on a device, such as via a GPS mapping function of a UI device set 123 of FIG. 1. For example, a UI device set 123 may include a human-to-machine interface such as a vehicle infotainment system. Alternatively, a human-to-machine interface may be instructed, via a command from the geospatial mapping server 240, to display a routing plan. In further embodiments, the routing module 312 may instruct a UI device set 123 to display all identified AVs within a map of the digital environment.

In embodiments, the IoT module 314 is configured to facilitate wireless network communication between the geospatial mapping server 240, the AV client 308A, and the non-AV client 308B. The geospatial mapping server 240, the AV client 308A, and the non-AV client 308B may be a part of a vehicle-to-everything (V2X) network, such as WAN 220 corresponding to WAN 102 of FIG. 1, facilitating communication between AVs (e.g., AV client 308A) and non-AVs (e.g., non-AV client 308B). The IoT module 314 may facilitate communication between the geospatial mapping server 240, the AV client 308A, and the non-AV client 308B via wireless local area network connection or cellular network connection for example. The IoT module 314 may communicate sensor suite 318 data, mapping data, route planning data, etc. to or from the geospatial mapping server 240, the AV client 308A, and the non-AV client 308B.

In embodiments, the GPS module 316 is configured to identify AV and non-AV locations based on GPS data received via satellite-based navigation systems. GPS data may be communicated to the SLAM module 310 to facilitate mapping of a digital environment. The GPS module 316 may use GPS data to approximate or determine relative distances between AVs and non-A Vs. In embodiments, the GPS module 316 may improve GPS location determination via convolutional neural network (CNN) or recurrent neural network (RNN). Improving the determining the location of the AV via CNN or RNN processing, pattern recognition, or predictive modeling of GPS data may include training a CNN or RNN to identify patterns in GPS and predict corrections to existing map data. In some embodiments, the SLAM module 310 may merge SLAM data with GPS data via data fusion, and processes the merged data through a CNN or RNN to predict corrections to existing map data. The AV client 308A or non-AV client 308B may communicate GPS data to the routing module 312 to generate a route in the digital environment for the non-AV to take in order to avoid AV traffic. Routing module 312 may include pre-existing digital mapping data and may update mapping data with real-time GPS data received from the AV client 308A or non-AV client 308B. In embodiments, the routing module 312 may receive route start and end points, such as a current location identified via GPS module 316 and a user-input end point, to facilitate route planning.

Figure 3:
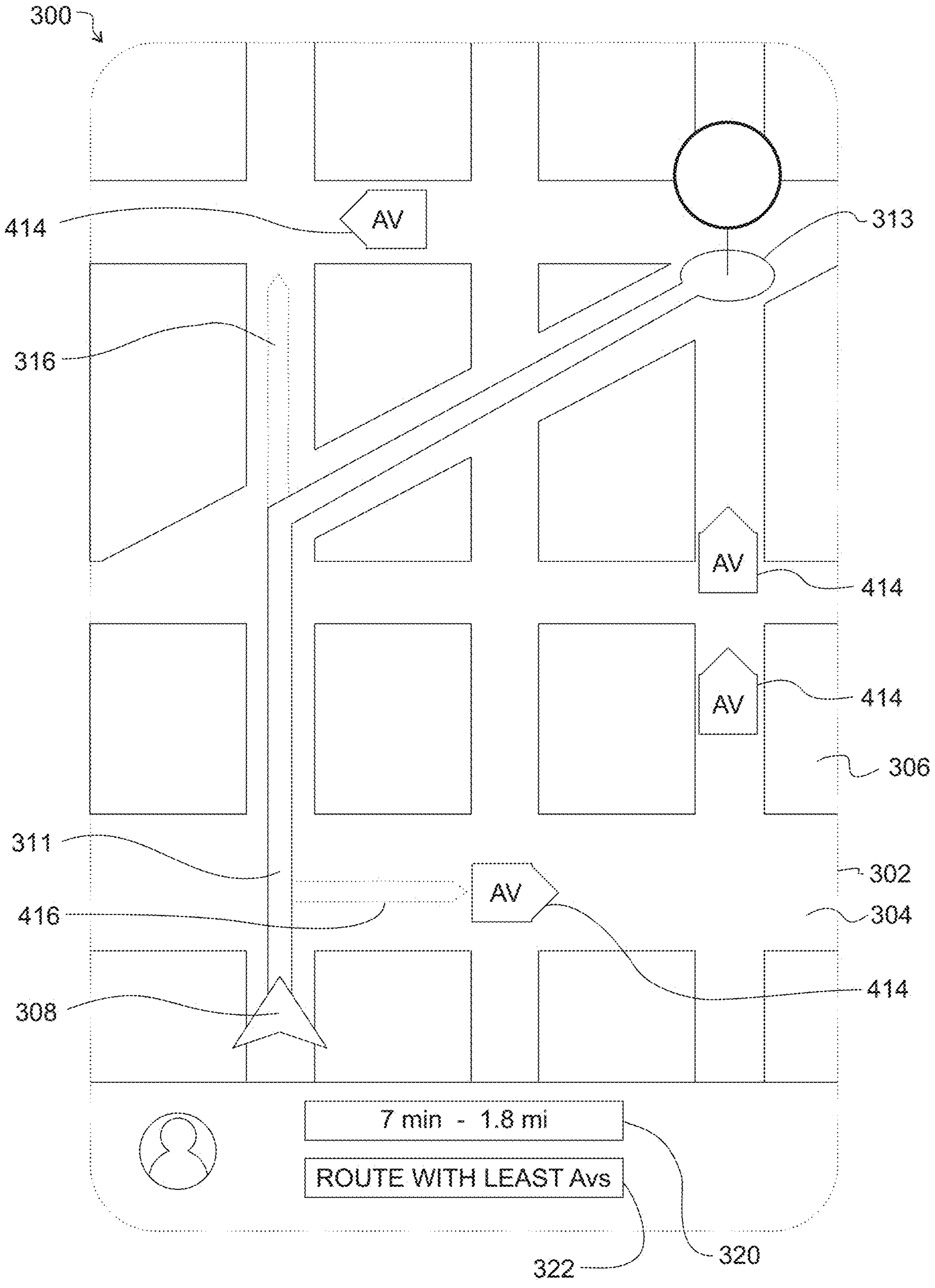
FIG. 3 shows a diagram of an exemplary environment in accordance with aspects of the present invention.

FIG. 3 shows an environment 300 including digital environment 302 including a map user interface for route planning, which may be a digital map displayed on the EUD 103 of FIG. 1. In embodiments, the non-AV client 308B of FIG. 2 instructs an EUD 103 to display the digital environment 302. In embodiments, digital environment 302 is an interactive digital map displayed on a device such as a smartphone or vehicle infotainment system, such as a vehicle infotainment system associated with the non-AV client 308B of FIG. 2. The digital environment 302 may include, for example, roadways 304 and obstacles 306 (such as structures, foot paths, street-level parking lots, etc.), a route plan 311 including a start point 308 and an endpoint 313 mapped by the SLAM module 310 and generated by the routing module 312 of FIG. 3. The digital environment 302 may include AVs 414 as identified by the module 312 in cooperation with the GPS module 316 of FIG. 3. The route plan 311 may be generated to avoid AVs 414 or alternative routes 416 that may encounter AV 414 presence, e.g., being on the same roadway as an AV or being within relative proximity of an AV. As an example, the route plan 311 is generated to avoid AVs within the route plan 311 or any alternative routes 416 that may encounter an AV 414 within the route. The digital environment 302 may include route plan 311, supplemental data 320, and route filters 322. Route filters 322 may include additional filtering to avoid, for example, major highways, construction areas, etc. Supplemental data 320 may include route plan 311 distance or travel time information. Route filters 322 may include information relating to route planning modifications or constraints that are active and affecting routing planning performed by the routing module 312 of FIG. 3.

Figure 4:
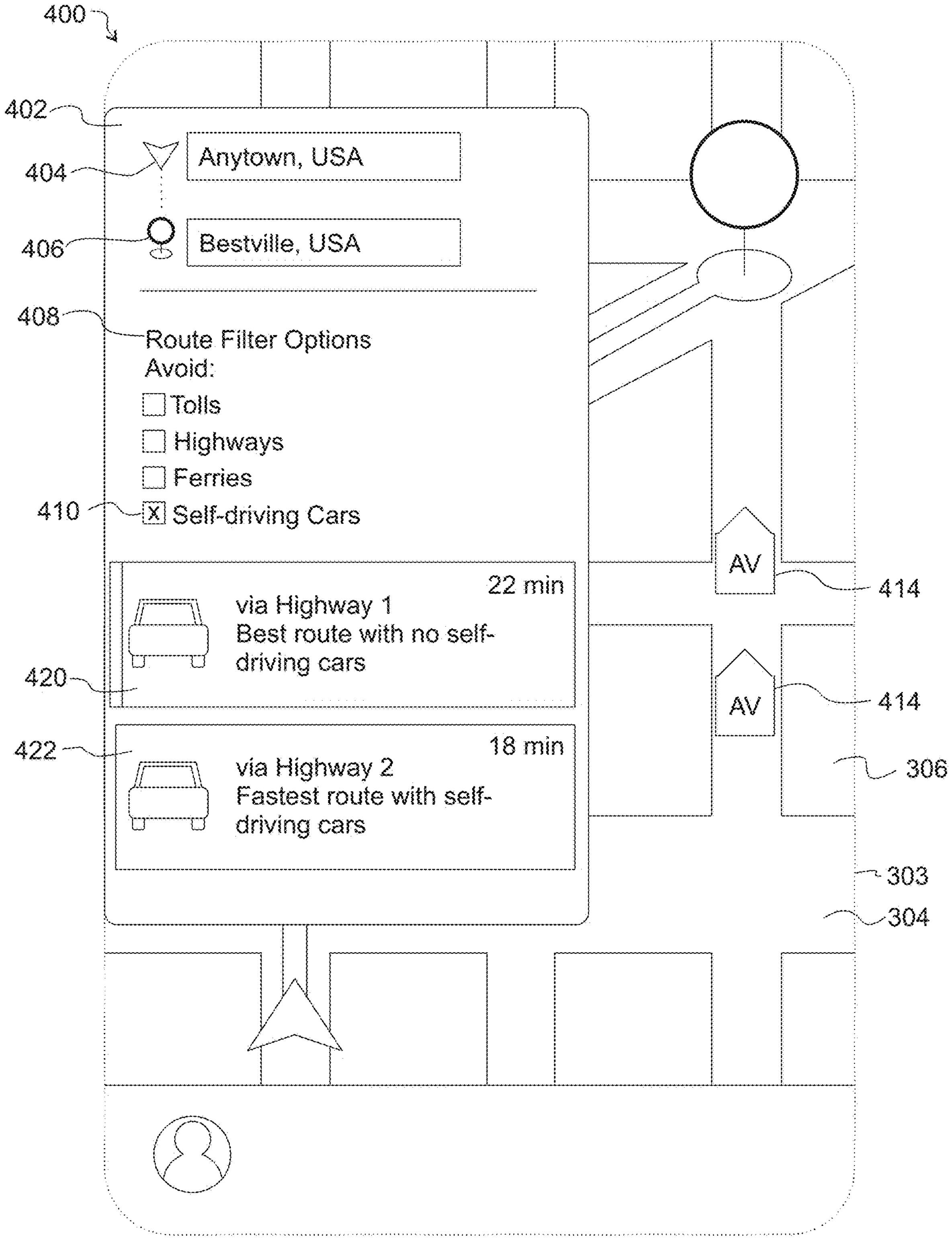
FIG. 4 shows a diagram of an exemplary environment in accordance with aspects of the present invention.

FIG. 4 shows an environment 400 including digital environment 303 including a map user interface for route planning corresponding to digital environment 302 of FIG. 3, which may be a digital map displayed on the EUD 103 of FIG. 1. In embodiments, digital environment 303 is an interactive digital map displayed on a device such as a smartphone or vehicle infotainment system. The digital environment 303 may include, for example, roadways 304 and obstacles 306 (such as structures, foot paths, street-level parking lots, etc.), a route plan 311 including a start point and an endpoint mapped by the SLAM module 310. The digital environment 303 may be generated by the routing module 312 of FIG. 3. The digital environment 303 may include AVs 414 as identified by the routing module 312 in cooperation with the GPS module 316 of FIG. 3. The route plan 311 may be generated to avoid AVs 414 or alternative routes that may encounter AV 414 presence. The digital environment 303 may include a route planning interface 402, including a start location 404 and a destination 406 corresponding to the endpoint 313 of FIG. 3. The interface 402 may include route filter options 408 corresponding to the route filters 322 of FIG. 3, allowing a driver to provide an input such as a checkmark to, for example, filter route planning to avoid self-driving cars 410, such as the AV 414 of FIG. 3. The interface 402 may display generated route plans route plan 311 of FIG. 3, including "best route with no self-driving cars" text 420 and alternative routes, such as "fastest route with self-driving cars" text 422. Generated route plans may be selected based on driver input to the interface 402 via the AV client 308A or non-AV client 308B.

Figure 5:
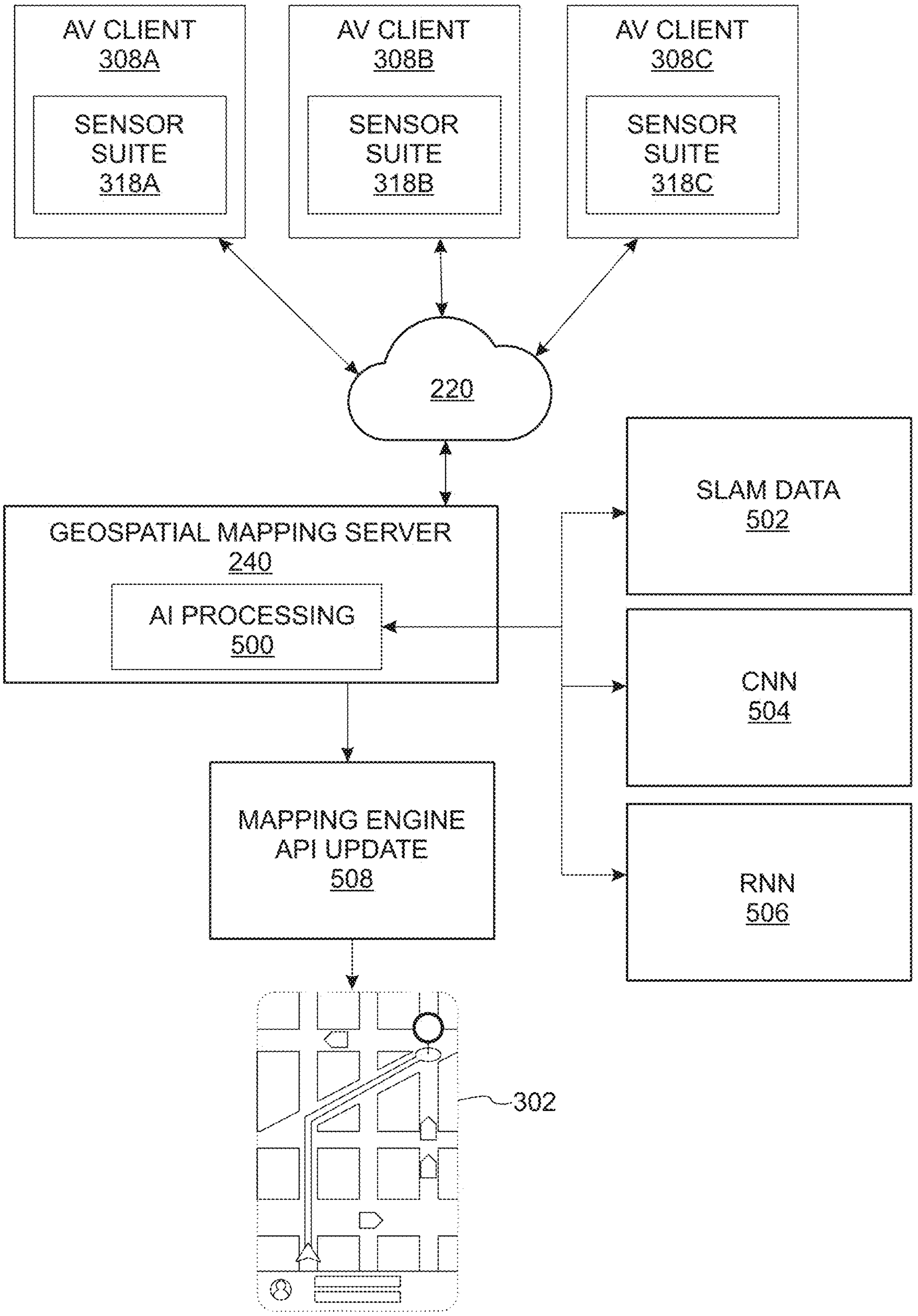
FIG. 5 shows a block diagram of an exemplary environment in accordance with aspects of the present invention.

FIG. 5 shows a block diagram of an exemplary environment in accordance with aspects of the present invention. A plurality of AV clients 308A, 308B, and 308C with corresponding sensor suits 318A, 318B, and 318C may be in operable communication with the geospatial mapping server 240, for example, over WAN 220. Each of the AV clients 308A, 308B, and 308C, sensor suites 318A, 318B, and 318C, geospatial mapping server 240, and WAN 220 correspond to the AV client 308, sensor suite 318, geospatial mapping server 240, and WAN 220 of FIG. 3, respectively. The geospatial mapping server 240 may include AI processing 500 of SLAM data 502 for improving a mapping engine, such as a third-party mapping engine, via a mapping engine application programming interface (API) update 508. SLAM data 502 may include, for example, processed or feature-extracted sensor suite data. The GPS module 316 may improve the determination of a location of the AV via CNN or RNN AI processing 500 of GPS data. AI processing 500 may train a CNN 504 or RNN 506 to identify patterns in SLAM data 502 or GPS data and predict corrections to existing map data. In some embodiments, the SLAM module 310 of FIG. 2 may merge SLAM data 502 with GPS data received from the AV client 308A or non-AV client 308B of FIG. 2 via data fusion and processing the merged data through a CNN 504 or RNN 506 to predict corrections to existing map data. The geospatial mapping server 240 may generate a mapping engine API update 508 including processed merged data used to augment an existing global positioning system navigation system with merged sensor suite data and visual analysis data and improve mapping functionality performed by the routing module 312 of FIG. 2, such that an improved digital environment 302 may be generated. That is, the geospatial mapping server 240 may generate a more accurate digital environment 302 using the processed merge data to update, supplement, or replace existing map data.

Figure 6:
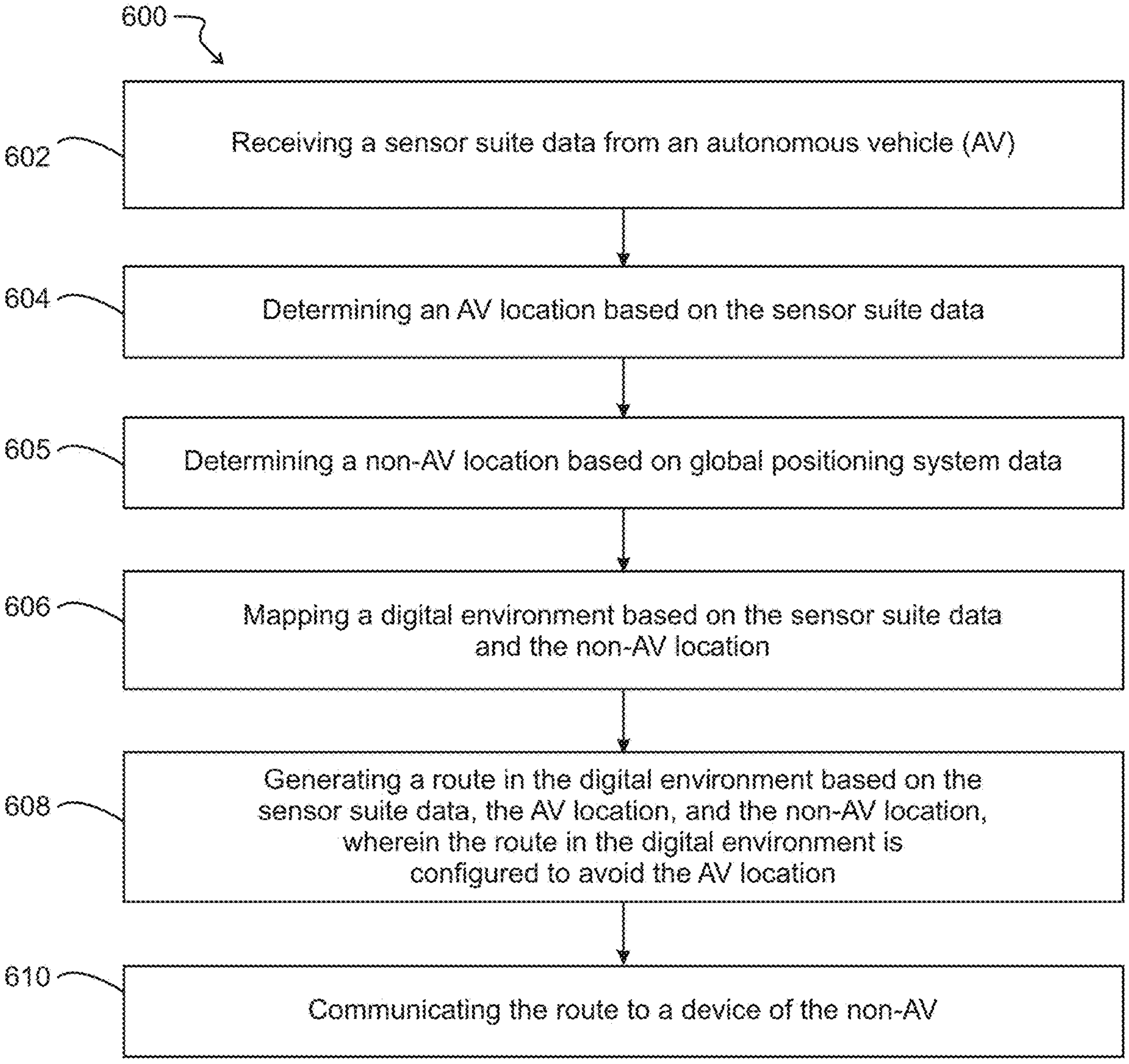
FIG. 6 shows a flowchart of an exemplary method in accordance with aspects of the present invention.

FIG. 6 shows a flowchart of an exemplary method 600 in accordance with aspects of the present invention. In step 602, a system, computer program product, or computer-implemented method may include receiving sensor suite data from an autonomous vehicle (AV) via the SLAM module 310 of FIG. 3. Step 604 may include determining an AV location based on the sensor suite data via the SLAM module 310 of FIG. 3. Step 605 may include determining a non-AV location based on global positioning system data via the GPS module 316 of FIG. 3. Step 606 may include mapping a digital environment based on the sensor suite data and the non-AV location via the SLAM module 310 of FIG. 3. Step 608 may include generating a route in the digital environment based on the sensor suite data, the AV location, and the non-AV location, wherein the route in the digital environment is configured to avoid the AV location via the routing module 312 of FIG. 3. Step 610 may include communicating the route to a device of the non-AV via the routing module 312 of FIG. 3.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, sensor suite data from an autonomous vehicle (AV), wherein the sensor suite data indicates that the AV has switched from operating in an autonomous driving mode to operating in a non-autonomous driving mode, or that the AV has switched from operating in a non-autonomous driving mode to operating in an autonomous driving mode;

determining, by the processor set, an AV location based on the sensor suite data using a neural network trained on the sensor suite data fused with global positioning system data;

determining, by the processor set, a non-AV location of a non-AV based on the global positioning system data;

mapping, by the processor set, a digital environment based on the sensor suite data and the non-AV location, wherein the mapping includes extracting features from the sensor suite data to identify one or more objects within a real-world environment, and wherein the mapping further includes dynamically updating the digital environment based on changes in the extracted features;

generating, by the processor set, a route for the non-AV in the digital environment based on the sensor suite data, the AV location, and the non-AV location, wherein the route is configured to avoid the AV location in response to the sensor suite data indicating that the AV has switched to operating in the autonomous driving mode, and wherein the route is dynamically modified in response to the sensor suite data indicating that the AV has switched to operating in the non-autonomous driving mode; and communicating, by the processor set, the route to a device of the non-AV.

2. The computer-implemented method of claim 1, wherein the sensor suite data comprises a status of a sensor indicating that the AV is operating in the autonomous driving mode.

3. The computer-implemented method of claim 1, wherein the determining the AV location comprises identifying the location of the AV based on a global positioning system and the sensor suite data.

4. The computer-implemented method of claim 3, further comprising:

performing neural network processing of the sensor suite data; and updating the digital environment based on processed sensor suite data.

5. The computer-implemented method of claim 1, wherein the determining the AV location comprises determining the AV location within a predetermined radius relative to the non-AV location.

6. The computer-implemented method of claim 1, wherein the mapping the digital environment is performed by an algorithm configured to:

perform the feature extraction on the sensor suite data to identify vehicle, pedestrian, and object mapping data based on visual analysis performed on the sensor suite data.

7. The computer-implemented method of claim 1, wherein the generating the route for the non-AV in the digital environment comprises finding a shortest path between a first state and a final state via a shortest pathfinding algorithm using the global positioning system data, and wherein the route in the digital environment is configured to avoid the AV location.

8. The computer-implemented method of claim 1, further comprising:

merging, via data fusion, the sensor suite data and visual analysis data; and augmenting an existing global positioning system navigation system with the merged sensor suite data and visual analysis data.

9. The computer-implemented method of claim 1, further comprising modifying the route based on a driver input.

10. The computer-implemented method of claim 1, wherein the sensor suite data comprises AV data comprising light detection and ranging data.

11. A computer program product comprising one or more computer readable storage media having program instructions collectively stored on the one or more computer readable storage media, the program instructions executable to:

receive a sensor suite data from an autonomous vehicle (AV), wherein the sensor suite data indicates that the AV has switched from operating in an autonomous driving mode to operating in a non-autonomous driving mode, or that the AV has switched from operating in a non-autonomous driving mode to operating in an autonomous driving mode;

determine an AV location based on the sensor suite data using a neural network trained on the sensor suite data fused with global positioning system data;

determine a non-AV location of a non-AV based on the global positioning system data;

map a digital environment based on the sensor suite data and the non-AV location, wherein the mapping includes extracting features from the sensor suite data to identify one or more objects within a real-world environment, and wherein the mapping further includes dynamically updating the digital environment based on changes in the extracted features;

generate a route for the non-AV in the digital environment based on the sensor suite data, the AV location, and the non-AV location, wherein the route is configured to avoid the AV location in response to the sensor suite data indicating that the AV has switched to operating in the autonomous driving mode, and wherein the route is dynamically modified in response to the sensor suite data indicating that the AV has switched to operating in the non-autonomous driving mode; and communicate the route to a device of the non-AV.

12. The computer program product of claim 11, wherein the sensor suite data comprises a status of a sensor indicating that the AV is operating in the autonomous driving mode.

13. The computer program product of claim 11, wherein the determining the AV location comprises identifying the location of the AV based on a global positioning system and the sensor suite data.

14. The computer program product of claim 13, wherein the program instructions are executable to:

perform neural network processing of the sensor suite data; and update the digital environment based on processed sensor suite data.

15. The computer program product of claim 11, wherein the determining the AV location comprises determining the AV location within a predetermined radius relative to the non-AV location.

16. The computer program product of claim 11, wherein the mapping the digital environment is performed by an algorithm configured to:

perform the feature extraction on the sensor suite data to identify vehicle, pedestrian, and object mapping data based on visual analysis performed on the sensor suite data.

17. The computer program product of claim 11, wherein the generating the route for the non-AV in the digital environment comprises finding a shortest path between a first state and a final state via a shortest pathfinding algorithm using the global positioning system data, and wherein the route in the digital environment is configured to avoid the AV location.

18. A system comprising:

a processor set, one or more computer readable storage media, and program instructions collectively stored on the one or more computer readable storage media, the program instructions executable to:

receive a sensor suite data from an autonomous vehicle (AV), wherein the sensor suite data indicates that the AV has switched from operating in an autonomous driving mode to operating in a non-autonomous driving mode, or that the AV has switched from operating in a non-autonomous driving mode to operating in an autonomous driving mode;

determine an AV location based on the sensor suite data using a neural network trained on the sensor suite data fused with global positioning system data;

determine a non-AV location of a non-AV based on the global positioning system data;

map a digital environment based on the sensor suite data and the non-AV location, wherein the mapping includes extracting features from the sensor suite data to identify one or more objects within a real-world environment, and wherein the mapping further includes dynamically updating the digital environment based on changes in the extracted features;

generate a route for the non-AV in the digital environment based on the sensor suite data, the AV location, and the non-AV location, wherein the route is configured to avoid the AV location in response to the sensor suite data indicating that the AV has switched to operating in the autonomous driving mode, and wherein the route is dynamically modified in response to the sensor suite data indicating that the AV has switched to operating in the non-autonomous driving mode; and communicate the route to a device of the non-AV.

* * * * *